United States Patent [19]

Schlafly

[11] Patent Number: 5,299,197
[45] Date of Patent: Mar. 29, 1994

[54] COMMUNICATIONS PACKET SERVER PROTOCOL

[76] Inventor: Roger Schlafly, P.O. Box 1680, Soquel, Calif. 95073

[21] Appl. No.: 835,159

[22] Filed: Feb. 11, 1992

[51] Int. Cl.⁵ .............................................. H04J 3/24
[52] U.S. Cl. .................................. 370/94.1; 370/91; 395/153; 395/155; 395/161
[58] Field of Search ............... 370/94.1, 91; 395/153, 395/155, 161

[56] References Cited

U.S. PATENT DOCUMENTS 4,972,368  11/1990  O'Brien et al. ..................... 364/900
5,062,104  10/1991  Lubarsky et al. .................. 370/94.1
5,214,756   5/1993  Franklin et al. ................. 395/161 X

OTHER PUBLICATIONS

MS-Windows Users Guide, Microsoft Corp., 1990–1992, pp. 379–408.
Getting Started with Microsoft Windows, Microsoft Corp., 1990–1992, pp. 6–9, 93–95.

*Primary Examiner*—Douglas W. Olms
*Assistant Examiner*—Russell Blum

[57] ABSTRACT

A method for interactive transmission of information from one computer to others across communications channels. A computer server sends asynchronous packets of data based on requests from remote terminals. The packets are interpreted in a way that allows efficient transmission of text, pictures, menus, files, and programs.

4 Claims, 3 Drawing Sheets

COMMUNICATIONS PACKET SERVER PROTOCOL

BACKGROUND OF THE INVENTION

This invention relates to remote computer communications.

A computer bulletin board system is a popular means for communication between computers. It typically consists of a computer connected to one or more telephone lines, and program which interfaces to the telephone lines, sends menus, and exchanges messages and files. Such a computer configuration is shown in FIG. 1. The computer bulletin board acts as a server, and the computers which access it act as terminals. There might be more terminals than telephone lines being that not all the terminals are connected at once.

Most computer bulletin boards are designed to be usable by dumb (non-programmable) terminals. The bulletin board sends ASCII text, which scrolls across the screen of the terminal. Some have some special commands (eg, escape sequences) for things like moving the cursor or clearing the screen, but the basic operation is mainly that of sending raw text back and forth.

CompuServe is a major such service. Users can connect in a raw text mode, with a typical session consisting of a user issuing text commands and the system responding with text messages. There are user programs available which provide a friendlier front-end and automate some tasks, but they are still limited to doing one thing at a time.

Prodigy, a computer bulletin board service sponsored by IBM and Sears, does not follow this model and offers interactive graphics, but does not act as a server to a terminal program. The user is required to run a special program which interacts with Prodigy. You cannot cancel commands, download files, or automate requests.

None of these computer bulletin board services use packet servers as described in this invention. They cannot do background file transfers, local menus, or graphics which is both interactive and can be automated.

Existing communications protocols are limited in that even though the computers at both ends might be multi-tasking, only one task monopolizes the communications channel.

Microsoft Windows offers communications capabilities and a form of multitasking on personal computers. With it you can, for example, log into CompuServe on a telephone line, initiate a file transfer, and then switch to another task such as word processing so that functions can be performed while the file transfer is taking place. This is commonly referred to as a background file transfer. However, you cannot use the telephone line or the CompuServe connection for any other purpose while the file transfer is taking place.

As a result, usage of computer bulletin board services is severely constrained by primitive user interfaces and by communications bottlenecks.

Lubarsky et al disclose a system for processing digitized telephone calls in a computer network. It uses packet-based serial communications, error correcting codes, encryption, multiplexing, and packets which have commands for controlling the system. It has advantages for interfacing with telephone equipment of varying speed and reliability. However, it does not provide the end user with any new functionality. Each telephone is available for one telephone call at a time.

Most of these prior art networks, including those mentioned here, are modeled after a scheme where the central computer is the master and the remote computers are slaves. Such a model has drawbacks in that it imposes limitations on the remote computers.

Accordingly, it is an object of this invention to create a remote computer communications system which:

(a) allows as much processing as possible to take place on the local terminal.

(b) allows tasks to run in the background, so the remote computer is always responsive to commands and no single task monopolizes the communications channel.

(c) allows modern user interfaces.

(d) makes efficient use of the communications channel.

(e) can interface reliably and effectively with different kinds of computers.

SUMMARY

This invention concerns a protocol which applies to one computer, which acts as a database server, several other computers, which act as terminals, and a communications line connecting them. Digital information passes back and forth between the server and a terminal asynchronously.

The operation is as follows. The terminal sends commands to the server. Such a command is typically a variable-length string which requests one or more packets from the server. The server then sends these packets to the terminal.

The packet is an encoded body of data. It has a header from which the type and length of data can be deduced. The contents of the packets might be ordinary text. It might also be a graphics image, a file, a file fragment, or other object.

Packets can also be tables of commands. This eliminates the need to directly transmit interactive menus, as required in the prior art. With this invention, menus can be stored locally in the terminal. If the terminal does not have the necessary menu for a particular situation, then it can request the necessary information and store and display it locally.

In an ordinary ASCII terminal, the commands are typed by the user, and nearly all the traffic on the communications line is ASCII text that shows up on the screen. This invention uses a program on the terminal to send the commands. Such a command might be sent as a result of the user selecting a menu item on the terminal, or as part of a programmed procedure.

The packets being sent to the terminal in this invention are not just displayed as ASCII on the screen. They are buffered and stored in memory, where it might be converted to a screen image, depending on the type of the packet and the needs of the terminal user.

The processing of packets is such that the remote computer is always in control. It buffers the packet as it comes in, and the exact action depends on user settings and options at the remote computer. The user may cancel commands, refuse incoming packets, or ignore selected packets.

This invention has several advantages over the prior art. For one thing, it makes much more efficient use of the communications channel. ASCII terminals typically receive 7-bit text data, whereas this invention can use 8-bit compressed data, for at least twice the throughput.

Another advantage is that it is much easier to handle multiple tasks or threads. A request might result in multiple packets being sent, and other packets can be intermingled. For example, a terminal might request a large file and it may come in 100 packets. While those packets are coming, the terminal can issue other commands and receive other packets, and thus effectively download the large file in the background. Existing systems are not able to handle multiple file background downloads.

Still another advantage is that more processing takes place in the terminal. Display of menus and graphics uses the terminal processor to do the work. Current terminal programs have processors which are idle most of the time.

Still another advantage is that terminal tasks can be more easily automated. With this invention it is practical to have modeless commands. In the prior art, the operation of each command depends very strongly on the context. Modeless commands can be a lot less confusing to the terminal user, and certainly simpler for programs automating terminal operations.

DESCRIPTION OF THE PREFERRED EMBODIMENT

In the preferred embodiment of this invention, the remote computer has the capability to interpret the incoming packets. A packet may represent a graphics image, in which case the remote computer has the ability to rasterize and display graphics images. An incoming packet which has a list of commands can be interpreted as a menu giving the user at the remote terminal a list of choices.

The packet contents may also be a procedure or program which can be executed on the terminal.

In the preferred embodiment, such a program would be in a device-independent language. Possibilities include variants of P-code (pseudo-code) or a page description language such as Postscript. Such a program might draw a picture on the terminal screen, play an interactive game, or access disk files. The terminal would have an interpreter capable of executing the program.

In the preferred embodiment, the packet is compressed, and has a redundancy check. The compression allows more data to be sent in smaller packets. The redundancy check allows testing the integrity of the packet, so that an invalid packet can be discarded or retransmitted.

This invention is best implemented on computers with multitasking operating systems. In the better operating systems, the tasks can share memory and other resources, and are usually called threads.

Each time a command is issued from the terminal, a thread is started on the terminal and a thread identifier in included in the command. The thread identifier might be a single byte.

In an operating system that doesn't support multiple threads, or if the thread overhead is too large, an embodiment might simulate multitasking by being event-driven and processing user-issued commands and incoming packets as they happen. If an event occurs before processing of a previous event is completed, the processing on the old event is suspended so that processing of the new one can be initiated.

For the purpose of processing commands, the terminal acts as the master and the server is the slave. The terminal controls the sequence of events by issuing appropriate commands. The server merely responds to those commands, and to commands of other terminals which are connected to the server.

Figure 1:
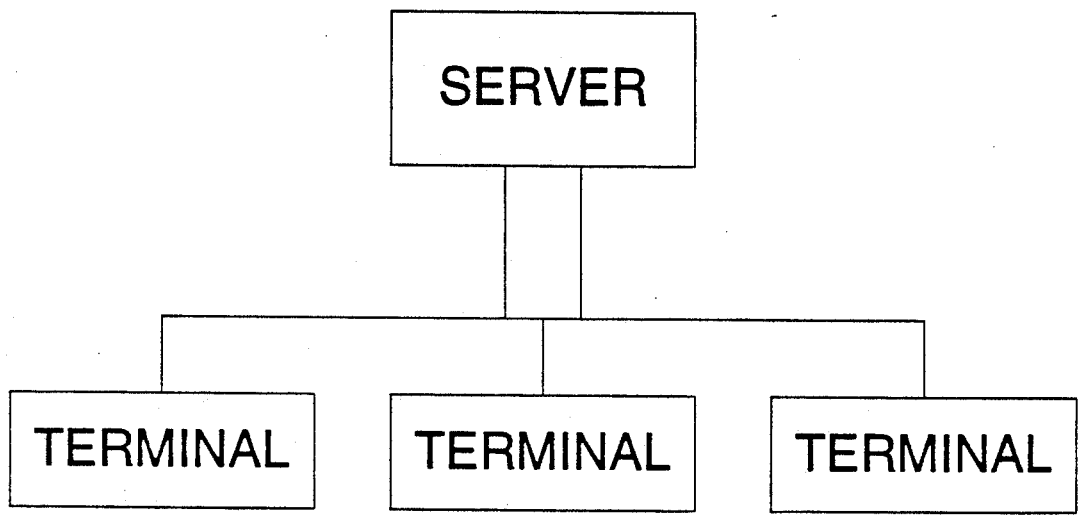
FIG. 1 shows a server connected to several remote computers.
Figure 2:
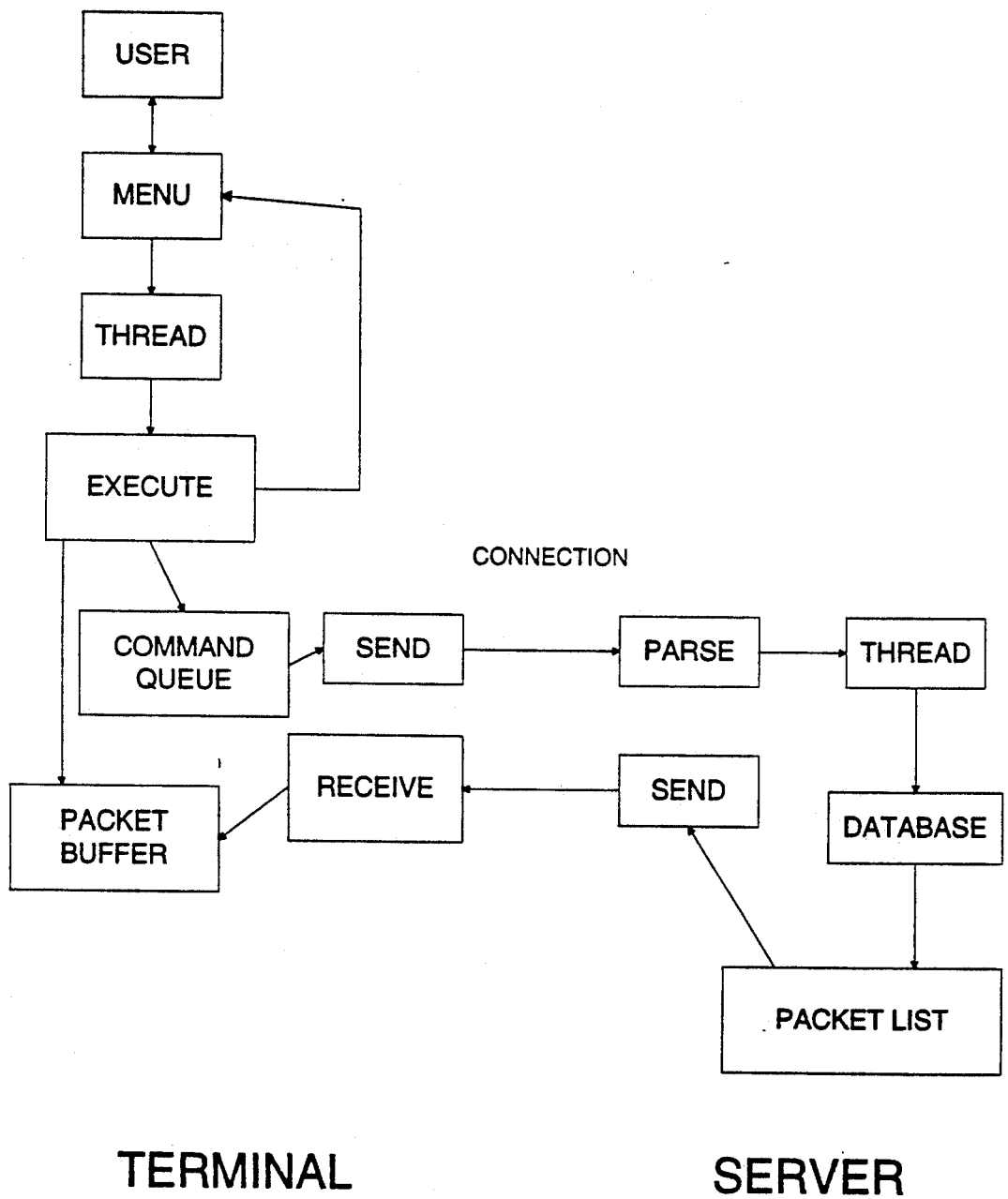
FIG. 2 shows the server logic for accepting commands and dispatching packets.

FIG. 2 shows a flow chart detailing how commands and packets are exchanged. The user runs a program on his terminal who displays menus of command choices. Each command starts a thread which queues the command for sending to the server. Because the connection might be slow, the command sender might have to wait for other commands. When the command is sent to the server, the server parses the command and starts a thread. Most commands involve retrieving some data from a database, and the data is appended to the packet list where it can be sent to the terminal. When the terminal receives a packet, it is buffered until the appropriate thread running on the terminal can process the thread.

Figure 3:
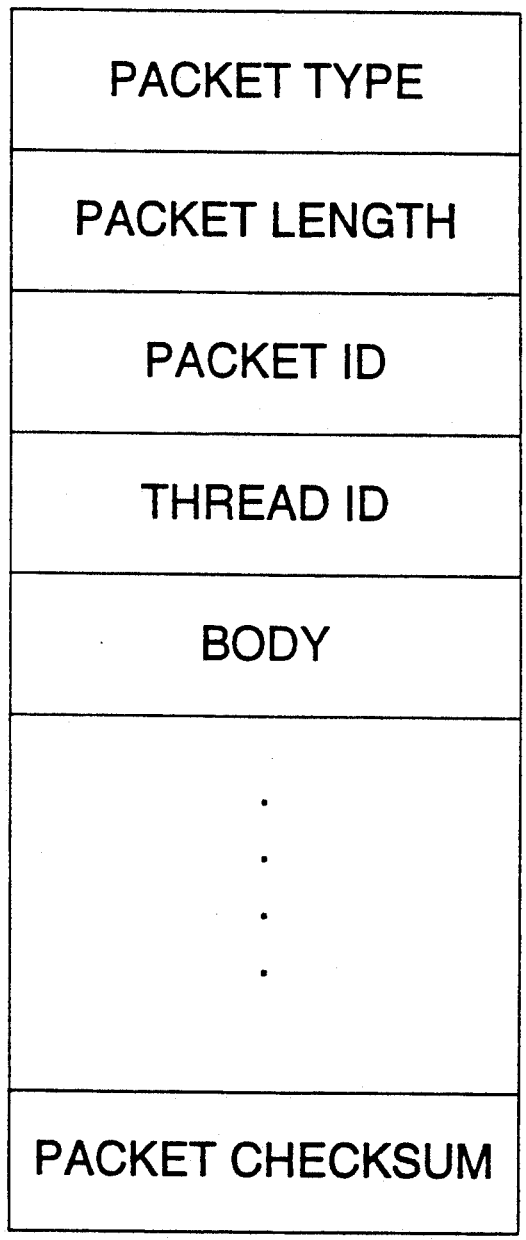
FIG. 3 shows the structure of a typical packet.

The structure of a typical packet is shown in FIG. 3. There is a header of a few bytes indicating the nature of the packet, followed by the contents. The first item in the header is the type, 16 bits indicating what sort of packet will follow. Some possible types are file, password handshake, image, page description language program, or menu.

The next field is the length, 16 bits indicating the number of bytes in the body of the packet. A terminal which cannot handle a particular packet may choose to skip it, and the length makes this possible.

The next field is the packet id, 32 bits that the server constructs when it generates the packet. The information in it is not necessarily meaningful to the terminal, but it uniquely characterizes the packet to the server. If a terminal doesn't receive a packet properly, it can use the packet id to request that it be resent.

The next field is the thread id, 16 bits copied from a server command. Since the terminal may have multiple threads running and issuing commands, the thread id serves to allow the terminal to assign the packet to the appropriate thread. Following these header fields is the body of the packet. The body can be any sequence of data bytes.

The final field is the checksum. This is 32 bits computed from the rest of the packet serving as a redundancy check. It is also called a hash value in the literature. It validates the integrity of the packet because it can be recomputed by the terminal. If it doesn't match, the terminal can request that the packet be resent.

This invention is intended to be useful when the server is unattended an the terminal is operated interactively by a user. It is also useful when the user runs a program to automate tasks that he might otherwise do manually, or when the terminal operation is automated altogether. For example, a terminal program might regularly update a stock portfolio by connecting with a stock price database server, issuing the appropriate commands, and extracting the relevant data from the packets. Or a user might tell his program t update his mailbox, and then the terminal program will issue several commands to send and receive mail messages.

The scope of the invention should be determined by the appended claims and their legal equivalents.

I claim:

1. A digital communications system comprising
   (a) a database server,
   (b) one or more terminals,
   (c) an asynchronous communications channel connecting said server to said terminals,
   (d) means by which said terminals can send commands to said server,
   (e) means by which said server can interpret said commands as database queries,
   (f) means by which said server assembles the requested data into packets,
   (g) means for said server to dispatch said packets to said terminals,
   (h) means for said terminals to process multiple tasks simultaneously,
   (i) means for said terminals to associate said packets to said multiple tasks, whereby the communication channel is utilized for said multiple tasks simultaneously,
   (j) means by which said terminals can properly interpret the packets.

2. The system of claim 1 wherein said packets have a header specifying the type of packet having contents one of the following:
   (a) a text message,
   (b) a graphics image,
   (c) a page description language program,
   (d) code for an executable procedure or program,
   (e) a file or file fragment,
   (f) a table of additional commands,
   (g) other data object.

3. The system of claim 1 with said terminals further comprising the means to
   (a) buffer incoming packets,
   (b) accept background file transfers,
   (c) execute programs derived from packets,
   (d) rasterize and display graphics images,
   (e) cancel commands or refuse incoming packets,
   (f) ignore selected packets,
   (g) display menus based on information received in previous packets.

4. The system of claim 1 wherein said packets are compressed and have redundancy checks.

* * * * *